United States Patent [19]

Maier et al.

[11] Patent Number: 5,034,263

[45] Date of Patent: Jul. 23, 1991

[54] FILM LAMINATE

[75] Inventors: Larry K. Maier, Rochester; Jong S. Lee, Pittsford, both of N.Y.

[73] Assignee: Eastman Kodak Company, Rochester, N.Y.

[21] Appl. No.: 441,730

[22] Filed: Nov. 27, 1989

[51] Int. Cl.$^5$ ............................................... B32B 7/02
[52] U.S. Cl. ..................................... 428/215; 428/480; 428/482
[58] Field of Search .................... 428/480, 482, 215; 524/765; 525/481

[56] References Cited

U.S. PATENT DOCUMENTS

| | | | |
|---|---|---|---|
| 2,901,466 | 8/1959 | Kibler et al. | 260/75 |
| 3,651,172 | 3/1972 | Barkey et al. | 260/860 |
| 4,614,681 | 8/1986 | Hayashi et al. | 428/480 |
| 4,636,442 | 1/1987 | Beavers et al. | 428/480 |

Primary Examiner—Merrell C. Cashion, Jr.
Assistant Examiner—Don Sumihiro
Attorney, Agent, or Firm—Robert A. Gerlach

[57] ABSTRACT

A laminated film of a polyethylene terephthalate core and on at least one surface thereof an overcoat of a cyclohexylmethylene terephthalate polyester.

7 Claims, No Drawings

FILM LAMINATE

BACKGROUND OF THE INVENTION

1. Field of the Invention

This invention relates to a laminated film, and more particularly to a laminated film, having as the core support member a polyethylene terephthalate film.

Polymeric films have found wide spread use in various applications including film base for photographic and magnetic recording members and also in the preparation of packaging materials. For photographic applications, cellulose acetate has become the most wide spread and preferred film base because its overall properties provide the optimum or close-to-optimum characteristics under the widest circumstance of use for photographic applications. A disadvantage of cellulose type film base is that in the preparation thereof, solvent coating applications are required which have been alleged to be harmful to the atmosphere and to humans.

In the applications for polymeric film set forth above, polyethylene terephthalate film has found an appreciable amount of use. However, polyethylene terephthalate film in some applications in the photographic industry is not suitable. A serious disadvantage with regard to polyethylene terephthalate film is that it is so tough i.e., its modulus is so high, that in the preparation of the film, particularly in the cutting operations, serious knife wear is caused, resulting in shut downs of the equipment in order to renew the knife edges. Also, in the preparation of motion picture film, the indexing holes which engage the sprockets in cameras and projectors, are formed by a punching operation. These punches are also rapidly worn because of the nature of the PET film. Not only is the wear of the knife edges utilized in the slitting operation and the wear of the punches for the formation of the indexing holes a problem but much debris is formed which interferes with the quality of the film when these cutting surfaces are dulled by continuous use. Still another problem with regard to the use of PET film base for motion picture films is that the toughness of the film prevents the film from breaking under certain conditions where film breaking is preferable to damage resulting to the components of the projector. It is preferred that the film break rather than the projector be damaged because of the cost involved in repair and also the time that the repair takes. Therefore, it would be an advantage to have a film base whose properties more approximate those of cellulose triacetate.

U.S. Pat. No. 2,901,466 issued to C. J. Kibler, A. Bell, and J. G. Smith on Aug. 25, 1959 and assigned to the same assignee as the immediate application discloses polyesters of 1,4-cyclohexanedimethanol and terephthalic acid for use in the preparation of films, fibers and other products wherein the products have improved dyeing qualities which permit dyeing to deep shades without the use of a carrier which is normal in the dyeing of polyethylene terephthalate.

U.S. Pat. No. 3,651,172 issued to K. T. Barkey and L. I. Laird on Mar. 21, 1972, and assigned to same the assignee as this application discloses linear block copolyesters of blends of poly(ethylenephthalate) with a random copolyphthalate of ethylene glycol and 1,4-cyclohexanedimethanol where the latter is present in an amount from 8 to 34 weight percent. Also disclosed is a laminated film having a polyethylene terephthalate film base which is laminated on one or both sides with the block copolyester described above.

SUMMARY OF THE INVENTION

The present invention provides a laminated film having a polyethylene terephthalate core (PET) and on at least one surface thereof an overcoat layer of a 1,4-cyclohexanedimethylene terephthalate polyester wherein the ratio of the thickness of the polyethylene terephthalate core to the overcoat layer varies from 1:9 to 9:1, preferably from 1:1 to 4:1. The quantity of 1,4-cyclohexanedimethylene groups in the polyester should be present in at least about 70 mol percent with the balance being ethylene glycol. At least 50 mol percent of the aromatic moieties present in the polyester of the overcoat layer should be due to the presence of terephthalic acid, the acid chlorides or lower alkyl esters thereof used in the esterification or transesterification with the balance being isophthalic acid or derivative thereof. Either one or both sides of the PET base can be overcoated with the CHDM-terephthalate. Preferably, the total thickness of the laminate should be less than 0.006 inch.

DETAILED DESCRIPTION OF THE PREFERRED EMBODIMENTS

The laminates prepared in accordance with this invention are extremely useful in that they are readily slit and perforated by the techniques usually employed in the preparation of film base for photographic and magnetic recording applications. It has been found that photographic film employing a film base in accordance with this invention is readily slit by the knife edges that slice the wide sheets into suitable sizes such as for example, 35 mm, 16 mm, and the like. Further, the perforations near the edge or edges of motion picture films and other consumer films are easily and readily punched without the concurrent dulling of the operative portion of the punching device as is the case with regard to polyethylene terephthalate films generally. The knife edges and punch operating surfaces are not dulled and the presence of debris because of rough edges is eliminated. While the applicants do not wish to be bound by any theory with regard to the mechanism by which this easy cutting operation takes place, it is postulated that as the knife blade engages the surface of the overcoat layer and begins to proceed through the thickness of the overcoat layer, a crack develops which permeates throughout the thickness of the entire film base thereby enabling the laminated film to be cut quite easily. Whereas with the polyethylene terephthalate film, because of the toughness of this film, the pressure of the knife blade is resisted by the film, thus requiring a higher force to permit the knife blade entrance into the thickness of the film, thereby causing debris and dulling of the knife blade to occur.

In the preparation of the laminated film in accordance with this invention, any suitable technique known in the art for the preparation of polyethylene terephthalate film (PET) may be employed. For the preparation of the laminated material the polyethylene terephthalate film may first be prepared and then after this film has solidified, the overcoat layer of the 1,4-cyclohexanedimethylene terephthalate film may be applied. In a preferred embodiment, however, the laminated film is prepared by the simultaneous co-extrusion of the two layers from 100 percent solids starting materials. In this regard, the two distinct layers maintain their integrity and do not blend into each other. Also, PET core layers having overcoats of the CHDM polyester on either side thereof may be prepared by a co-extrusion technique wherein all three distinct layers are simultaneously formed. Such techniques are widely known and reported in the prior art for preparation of thin polymeric films.

Polyethylene terephthalate films are widely known in the art of fiber and film manufacture and representative patents which teach the preparation of such materials include for example, U.S. Pat. Nos. 2,465,319 issued Mar. 22, 1949, 3,165,499 issued Jan. 12, 1965, and 3,256,379 issued Jan. 14, 1966, the entire contents of which are incorporated herein by reference.

With regard to the polyester for use in preparation of the overcoat layers, at least 50 mol percent of terephthalic acid component should be employed as either the acid, the acid chloride, or the lower alkyl esters should a transesterification be employed in the preparation of the polyester. The 1,4-cyclohexanedimethanol (CHDM) should comprise at least 70 mol percent of the glycol component of the polyester. Should less than 100 percent of CHDM be used as the glycol component the remainder should be ethylene glycol. It is preferred that the overcoat be a polycyclohexylenedimethylene terephthalate homopolymer. Any cyclohexylenedimethylene terephthalate polyester having the requirements set forth above may be employed in the practice of this invention. Those polyesters described in U.S. Pat. No. 2,901,466 (incorporated herein by reference) are suitable for use in accordance with this invention as overcoats.

According to an especially advantageous embodiment of this invention the overcoat layer or layers of polymeric linear polyesters are prepared by condensing (1) either the cis or the trans isomer or a mixture of the isomers of 1,4-cyclohexanedimethanol with (2) terephthalic acid or a mixture of terephthalate and isophthalic acid.

The overcoat layers are highly polymeric linear condensation polymers which contain in the molecular structure a substantial proportion of recurring groups having the following structural formula:

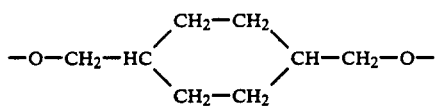

wherein the substituted cyclohexane ring is the cis or trans isomers or mixtures.

When the term 1,4-cyclohexanedimethanol or its structural formula appears herein without designation as to the isomer it includes either isomer or a mixture thereof. The letters CHDM are an abbreviation and have the same meaning.

The 1,4-cyclohexanedimethanol employed in making the overcoat layers can be used in combination with ethylene glycol so long as the 1,4-cyclohexanedimethanol is used in the amount of at least 70 mol percent of the total of such coreactants employed.

In forming the highly polymeric linear condensation polymers of this invention those persons having ordinary skill in this art will readily perceive the various types of polymeric compositions which can be prepared employing 1,4-cyclohexanedimethanol. Several types are more specifically described hereinbelow.

The polycyclohexylmethylene terephthalate polyesters include those having melting points as low as about 100° C. and as high as about 330° C. Those highly polymeric linear polyesters melting below about 300° C. are primarily useful for the preparation of overcoat layers by co-extrusion with PET.

While any suitable method may be used to prepare the laminated films in accordance with this invention, the preferred method is to simultaneously coextrude the PET core and overcoat layer or layers. The two or three layers of the laminate, as the case may be, are extruded in order to achieve the desired thickness ratio expressed above. By this technique, distinct layers of the various components are achieved.

In order to determine the cutting characteristics that is, the forces and the distance a knife must travel into a film material in order to cause the fracture throughout the thickness of the film, a test device for monitoring the cutting forces and the knife travel for cuts taking place in times as short as one millisecond is employed. This device includes a lower stationary knife upon which is placed the film support sample to be cut. The sample is placed with its forward edge extending slightly beyond the knife edge. A strain gauge is mounted on the lower knife to monitor the force during cutting. The strain gauge is calibrated by applying a weight acting through a lever arm to the lower knife. This produces a force of twenty-five pounds acting on the strain gauge.

An upper knife, positioned relative with respect to the lower knife in order to form a shearing zone, is driven pneumatically at speeds from 5 to 80 inches per second. The upper knife is guillotined like in appearance and its cutting edge has a shear angle which can be varied between 0° and 8° with respect to the horizontal surface of the lower fixed knife. In the tests reported below, the shear angle is maintained at 0°. Also, the upper knife has a rake angle this being the angle of the beveled sharpened edge of the upper knife of approximately 60°. A position transducer is attached to the upper knife housing which measures the amount of knife travel. A photodiode is mounted on the housing which provides a triggering pulse to activate an accompanying signal processor.

Clearance between the upper and lower knives is adjusted by moving the lower knife housing. A Vishay strain indicator attached to the lower housing records the change in lower knife position. An internal reference is established by adjusting the lower knife until it is just in contact with the upper knife. Clearance is held at 0.002 inches. Information from the source and distance transducers is recorded on a Nicolet four channel signal processor, only two channels of which are used. The first channel records the force as a function of time and the second channel records knife travel as a function of time. Utilizing a Hewlett-Packard x-y recorder, the force at right angles to each other can be determined and recorded.

In the following six examples, the resinous materials are extruded through an extrusion dye and cast onto a quenching roll maintained at a temperature of 120° F. rotating at a linear speed of 6 feet per minute. The original thickness of the resinous material is set at 0.05 inches. The film samples removed from the quenching roll are heated to from about 105° to about 115° and stretched in both the machine direction and the transverse direction. Finally, each of the stretched films is annealed at a 140° F. for 3 minutes.

EXAMPLE 1 (Comparison)

Polyethylene terephthalate is extruded at about 540° F. through an extrusion dye in accordance with the general procedure outlined above. The film is stretched three times its original width in both the machine and transverse directions.

EXAMPLE 2

The same general procedure as set forth above is practiced in this Example, wherein a polyester of terephthalate acid and 1,4-cyclohexanedimethanol is co-extruded with a poly(ethyleneterephthalate) polyester to form a co-extruded laminate wherein the thickness ratio of the 1,4-cyclohexanedimethanol terephthalate polyester to the polyethyl terephthalate polyester is 10/90. The temperature of the cyclohexanedimethanol polyester is extruded at about 580° F. while the temperature of the polyethylene terephthalate polyester is extruded at about 540° F. prior to casting onto the quench roll. The resulting laminate after removal from the quench roll is stretched three times its original width in both the machine and the transverse direction.

EXAMPLE 3

The procedure of Example 2 is repeated with the exception that the laminate after removal from the quench roll is initially stretched one and one-half times in the machine direction then three times in the transverse direction and finally three times in the machine direction.

EXAMPLE 4

The procedure of Example 2 is repeated with the exception that the thickness ratio of the polycyclohexanedimethanol terephthalate polyester to the polyethylene terephthalate ester is maintained at 23/77, the identical remaining conditions as in Example 2 are practiced.

EXAMPLE 5

The procedure of Example 3 is repeated with the exception that the ratio of the two polyesters is 23/77 as it was in Example 4. The stretching conditions are as set forth in Example 3.

EXAMPLE 6

A three layer laminate having a core layer of polyethylene terephthalate and overcoat layers on both surfaces of the core layer of 1,4-cyclohexanedimethanol terephthalate is prepared wherein the thickness ratio of the ingredients is 20/60/20. This laminate is stretched three times in both the machine and transverse directions.

The results of the six Examples are reported in Tables I and II wherein the test cutting device described above is employed for determining the cutting force necessary in both the machine direction and the transverse direction, these two forces being averaged in a third column and also the distance measurement set forth in inches $\times 10^{-3}$ is reported under the heading Knife Elongation. This column also reports the dimension in both the machine direction and the transverse direction together with the average value. This dimension is a measure of the distance that the upper knife travels into the film before the crack resulting from the movement of the knife permeates throughout the entire thickness of the film or laminated film. In Table I the cutting speed of the upper knife is set at 15 inches per second and in each of the six Examples the film thickness is approximately 0.006 inches. Table II is similar to Table I, however, it reports data wherein the upper knife moves at a cutting speed of 50 inches per second. The speed of 15 inches per second reported in Table I simulates the manufacturing operation wherein the film is slit from very wide dimensions to the predetermined size, depending upon the ultimate use to which the film is to be employed, while the speed of 50 inches per second, reported in Table II, simulates the punching operations for the formation of perforations in the film. This data clearly establishes that the presence of a layer of the cyclohexanedimethanol terephthalate polyester over the polyethylene terephthalate core requires a lower cutting force in each of the Examples than polyethylene terephthalate alone. This lower cutting force greatly improves the life of the cutting means whether by slitting or by punching because of the decreased force required. Further, visual observation after long periods of operation of the cutting device when practicing the procedures of Examples 2 through 6 establish lower levels of debris formation than that of the comparison Example after multiple cuts have been performed by the knife blades.

TABLE I

| Example No. | Cutting Force (pounds) | | | Knife Elongation (inches $\times 10^{-3}$) | | |
|---|---|---|---|---|---|---|
| | MD | TD | Avg. | MD | TD | Avg. |
| 1 | 59.0 | 61.0 | 60.0 | 9.0 | 10.0 | 9.5 |
| 2 | 47.5 | 56.6 | 52.0 | 5.3 | 6.0 | 5.7 |
| 3 | 52.0 | 49.0 | 50.4 | 5.4 | 5.3 | 5.3 |
| 4 | 44.4 | 47.5 | 46.0 | 5.8 | 6.1 | 5.9 |
| 5 | 48.8 | 43.0 | 46.0 | 5.6 | 5.9 | 5.7 |
| 6 | 38.2 | 36.7 | 37.5 | 7.5 | 6.2 | 6.8 |

TABLE II

| Example No. | Cutting Force (pounds) | | | Knife Elongation (inches $\times 10^{-3}$) | | |
|---|---|---|---|---|---|---|
| | MD | TD | Avg. | MD | TD | Avg. |
| 1 | 71.3 | 66.5 | 69.0 | 10.3 | 8.8 | 9.4 |
| 2 | 60.0 | 68.0 | 64.0 | 6.2 | 5.6 | 5.9 |
| 3 | 64.6 | 62.6 | 64.0 | 5.8 | 5.9 | 5.8 |
| 4 | 52.5 | 52.7 | 52.6 | 5.0 | 5.2 | 5.1 |
| 5 | 51.7 | 50.1 | 51.0 | 5.0 | 5.2 | 5.1 |
| 6 | 60.0 | 58.0 | 59.0 | 7.8 | 7.6 | 7.7 |

What is claimed is:

1. A laminated film comprising a polyethylene terephthalate core having on at least one surface thereof an overcoat layer of a 1,4-cyclohexanedimethanol terephthalate polyester the glycol component of which contains at least 70 mol percent of 1,4-cyclohexanedimethanol and the balance ethylene glycol the ratio of the thickness of the polyethylene terephthalate core to the 1,4-cyclohexanedimethanol terephthalate overcoat layer being from 1:9 to 9:1.

2. The laminate of claim 1 wherein both surfaces of said core contain an overcoat layer of 1,4-cyclohexanedimethanol terephthalate.

3. The laminate of claim 1 wherein the terephthalate portion of the polyester of the overcoat layer contains up to 50 mol percent isophthalate groups.

4. The laminate of claim 1 wherein the thickness ratio is 1:1 to 4:1.

5. The laminate of claim 2 wherein the polyester of the overcoat layers is a copolymer and each outer layer has a thickness of from 10 percent to 25 percent of the total laminate thickness of the laminate.

6. The laminated film of claim 1 wherein the total thickness of the laminate is less than 0.006 inch.

7. The laminate of claim 1 wherein the glycol component of the 1,4-cyclohexanedimethanol terephthalate polyester contains 100 percent of 1,4-cyclohexanedimethanol.

* * * * *